(No Model.) 2 Sheets—Sheet 1.
H. WYMAN.
SHUTTLE BOX MECHANISM FOR LOOMS.

No. 411,752. Patented Sept. 24, 1889.

Witnesses.
Fred S. Greenleaf
Frederick L. Emery.

Inventor.
Horace Wyman
by Crosby & Gregory
Attys.

(No Model.) 2 Sheets—Sheet 2.
H. WYMAN.
SHUTTLE BOX MECHANISM FOR LOOMS.
No. 411,752. Patented Sept. 24, 1889.
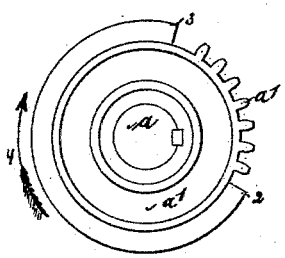
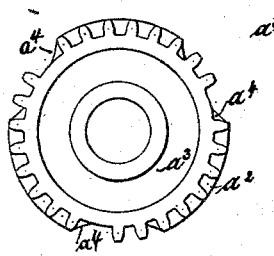
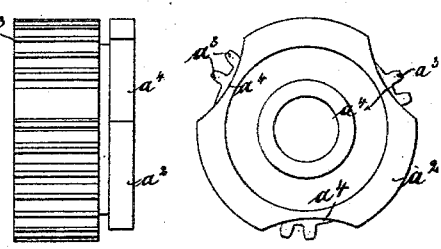
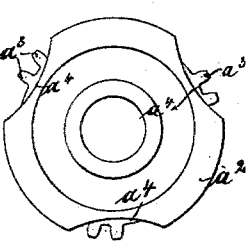
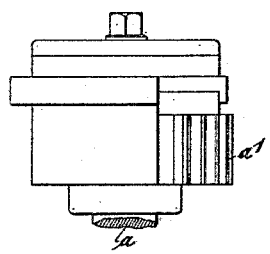
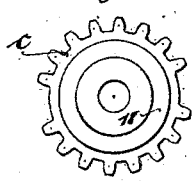
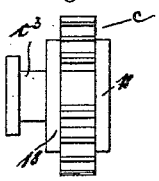
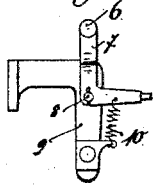
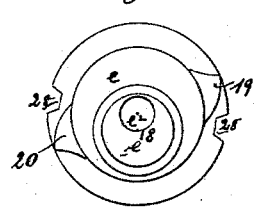
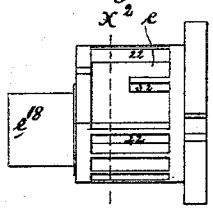
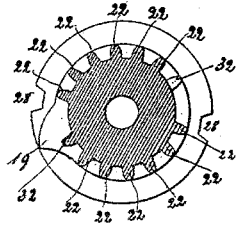
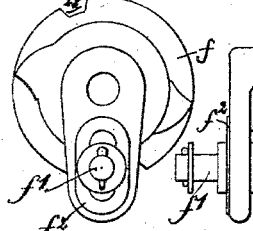
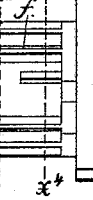
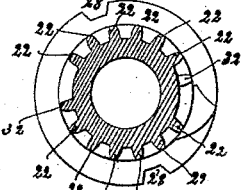
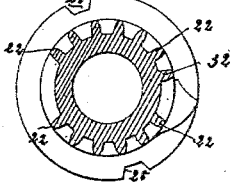
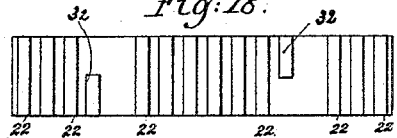

UNITED STATES PATENT OFFICE.

HORACE WYMAN, OF WORCESTER, MASSACHUSETTS, ASSIGNOR OF ONE-HALF TO THE CROMPTON LOOM WORKS, OF SAME PLACE.

SHUTTLE-BOX MECHANISM FOR LOOMS.

SPECIFICATION forming part of Letters Patent No. 411,752, dated September 24, 1889.

Application filed July 2, 1888. Serial No. 278,816. (No model.)

*To all whom it may concern:*

Be it known that I, HORACE WYMAN, of Worcester, in the county of Worcester and State of Massachusetts, have invented an Improvement in Shuttle-Box Mechanism for Looms, of which the following description, in connection with the accompanying drawings, is a specification, like letters on the drawings representing like parts.

This invention has for its object more especially to improve that class of looms having what is known as "change" or "shifting" shuttle-boxes.

One part of my present invention consists in the combination, in a loom, of the following instrumentalities, viz: a series of shuttle-boxes, a lever to move the same, a crank and an eccentric, shifting-gears attached thereto, an intermittingly-moving driving-gear, and indicating-gears located intermediate the said driving-gear and shifting-gears to impart to the latter gears a half-rotation and then run out of mesh with the said shifting-gears and leave them at rest, means to move the said indicating gears longitudinally on their axes to again cause them to engage and impart a half-rotation to the shifting-gears, as before, and stopping devices to prevent the shifting-gears from making more than a half-rotation after each longitudinal shifting of the said indicating-gears, which shifting is determined by or through a pattern-surface.

The stopping devices herein shown consist, essentially, of annular flanges at opposite sides of the indicating-gears and flanges connected with the shifting-gears and having projections which strike against the flanges of the indicating-gears when either shifting-gear has made a half-rotation, each shifting-gear having two of these projections, one near each end, and one being diametrically opposite the others.

Figure 1:
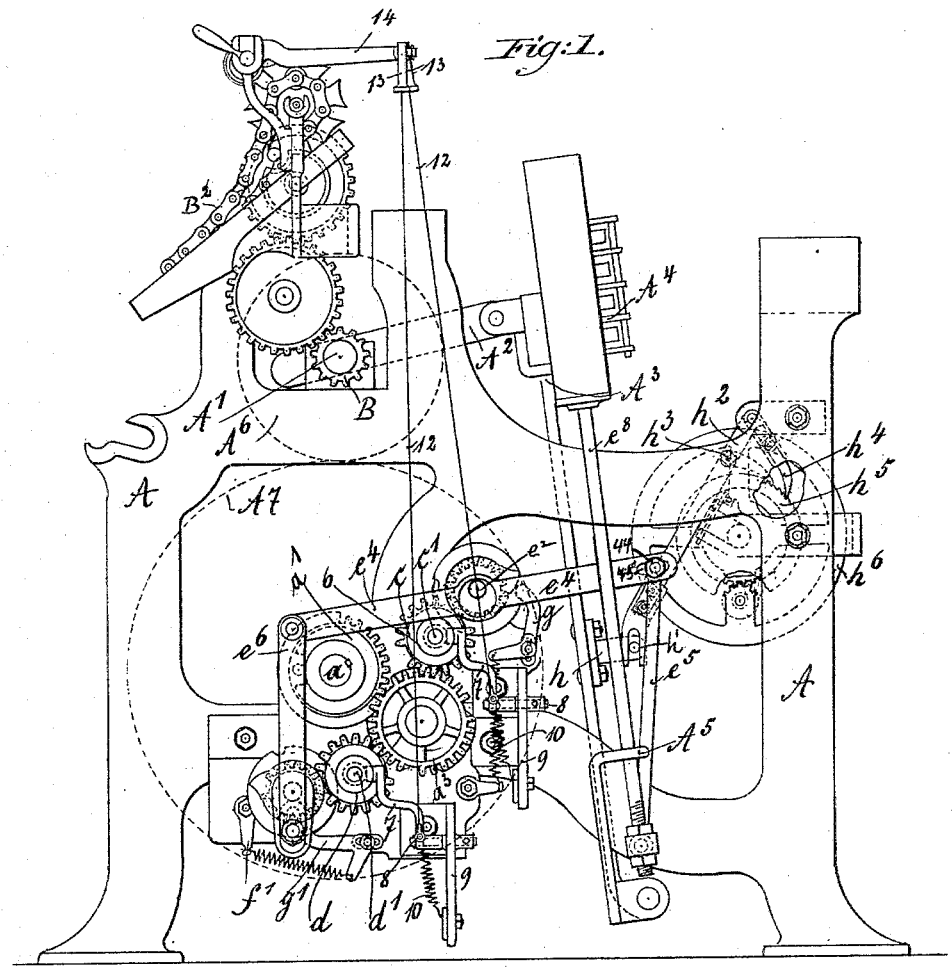
Figure 2:
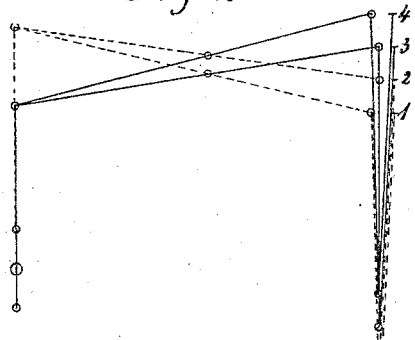

Figure 1 in side elevation represents a sufficient portion of a loom embodying my improvements to enable the same to be understood, the dotted lines showing the usual gears at the opposite end of the loom, so as to impart movement to the shuttle-box mechanism from the crank-shaft. Fig. 2 is a diagram showing different positions occupied by the opposite ends and center of the shuttle-box lever when the latter is shifted to place any one of four boxes in operative position with relation to the shuttle-race of the lay. Figs. 3 and 4 are respectively a front elevation and top or plan view of the partially-toothed gear and the cam or picking shaft, the said gear constituting the source of motion for the shuttle-box mechanism. Figs. 5, 6, and 7 are respectively a front, side, and rear elevation of the driving-gear of the shuttle-box mechanism. Figs. 8 and 9 are respectively a front and side elevation of one of the indicating-gears. Figs. 10 and 11 are respectively a front and side elevation of that one of the shifting-gears which supports the shuttle-box lever between its ends; Fig. 12, a section of Fig. 11 in the line $x^2$. Figs. 13 and 14 are respectively a front and side elevation of the shifting-gear employed to impart motion to the rear end of the shuttle-box lever; Figs. 15 and 16 are respectively sections in the lines $x^3$ $x^4$, Fig. 14; Fig. 17, a detail of the lever 7 and its support; and Fig. 18 shows the toothed part of one of the shifting-gears developed in a plane surface, so as to show the short teeth and spaces.

The frame-work A, of suitable shape to sustain the working parts, has suitable bearings for the crank-shaft $A'$, which by links $A^2$ is joined in usual manner with the lay $A^3$, it having a set of shifting shuttle-boxes $A^4$, the rod $e^8$ of which is guided in a guide $A^5$, all of usual construction. The crank-shaft $A'$ at its right-hand end has fast upon it a toothed gear $A^6$, (shown by dotted lines, Fig. 1,) which engages with a toothed gear $A^7$, (also shown by dotted lines,) fast on the right-hand end of the shaft $a$, mounted in suitable bearings (not shown) attached to the loom side, the said shaft in practice carrying the usual cams for operating the picking, &c. The crank-shaft $A'$ has secured to it, near its left-hand end, a toothed pinion B, which actuates the gearing employed to move the usual pattern-chain $B^2$, the said gearing being as usual and not herein claimed.

As represented in the drawings, the shaft $a$, at its left-hand end, has secured to it a partial gear $a'$, the said gear (best shown in Figs. 1, 3, and 4) having teeth extended about only a portion of its periphery, the balance of the periphery of the said gear from the points 2 to 3 in the direction of the arrow 4 having a smooth face to enter one after another and run in the concaved recesses or depressions $a^4$ (shown best in Fig. 5) in the flange $a^2$, forming part of the hub of a gear $a^3$, the latter constituting the driving-gear, and having, as herein shown, three series of teeth, (see Fig. 5,) which are successively engaged by the teeth of the continually-rotating toothed gear $a'$, the latter acting to rotate the driving-gear $a^3$ intermittingly—that is, the driving-gear $a^3$ is rotated so long as the teeth of the toothed gear $a'$ are in engagement with its teeth; but as soon as the teeth of the gear $a'$ run out of mesh with the teeth of the said driving-gear, which is the case as soon as the last tooth of the gear $a'$ arrives opposite a space in the driving-gear where a tooth has been removed, (see Figs. 5 to 7,) the flanged part of the toothed gear $a'$ by entering one of the concaved spaces $a^4$ acting to prevent further rotation of the driving-gear $a^3$ until the teeth of the toothed gear $a'$ again come around to engage a new section of teeth of the driving-gear $a^3$.

The driving-gear $a^3$ acts as the driver for like indicating-gears $c\ d$, (see Figs. 8 and 9,) the gear $c$ being mounted upon a stud $c'$, while the gear $d$ is mounted upon a stud $d'$, each of the said gears being free to both slide and to be rotated on the said studs intermittingly, the hub of each gear being provided near its outer end with an annular groove, as $c^3$, which is entered by a stud, as 6, (see Fig. 17,) of an elbow-lever, as 7, pivoted at 8 upon a like stand 9. Each of the said elbow-levers is acted upon by a like spring, as 10, to normally hold the indicating-gears $c\ d$ outwardly on their studs away from the loom side. Each of the levers 7 referred to is connected by a rod 12 and turn button or loop 13 to the finger 14, which rests upon the pattern chain or surface $B^2$, and is raised and lowered by the rolls and spaces of the same during the movement of the pattern-chain, all as usual.

The indicating-gears $c\ d$ referred to have at each side of their toothed surfaces smooth annular flanges, as at 18, (see Fig. 9,) against which at certain times act the projections 19 20, carried by the shuttle-box-shifting gears $e$ or $f$, to thus stop the rotation of the latter gears. The gear $e$ has an attached eccentric $e^{18}$, the gear $f$ an attached crank-arm $f^2$ and pin $f'$, and so I denominate the said gears as "shifting-gears," they acting in shifting the shuttle-boxes.

The indicating-gears $c\ d$ are alike, and each may, and preferably will, have a tooth omitted therefrom, as represented, (see Fig. 8,) such omission enabling the teeth of the indicating-gear to more readily engage the teeth of the shifting-gear.

Referring to Figs. 11, 12, 13, 14, and 15, the shuttle-box-shifting gears $e$ and $f$ have, it will be noticed, two series of six teeth 22, or teeth all the way across the gear, and at the rear of the sixth regular tooth of each series there is a short tooth 32, (see Fig. 18,) and then a space entirely across the gear where one tooth has been entirely removed, the space left by the omission of one entire tooth and part of the other tooth forming a sort of pocket in which the teeth of the indicating-gears enter when they run out of mesh with the shuttle-box-shifting gears, the latter gears coming to rest as soon as the teeth of the indicating-gears $c\ d$ run out of mesh therewith, the extent of rotation of the shuttle-box-shifting gears being throughout an arc of one hundred and eighty degrees, at which time one or the other of the projections 19 20 having a concaved edge arrives in contact with the convexed or circular periphery of one of the hubs or flange-like surfaces 18 of the indicating-gear next to it, and thereafter the shifting-gear, the projection of which rests against the said flanged surface 18, cannot rotate until after a change of position laterally with relation to each other of the said projections and flange-like surfaces, such change of position being effected as will be described. The short teeth 32 are substantially diametrically opposite each other, and each projects from one of the flanges of the gear in opposite directions, as best shown in Fig. 18. When in accordance with the pattern-chain it is desired to start a shuttle-box-shifting gear so held stationary, the pattern-chain working through the fingers 14 and rod 12 will shift the indicating-gear $c$ or $d$ longitudinally upon its stud $c'$ or $d'$, causing the teeth of the said gear to engage one of the short teeth 32 referred to and start the rotation with it of the shuttle-box-shifting gear, the latter being given a half-turn by the teeth of the indicating-gear, when it again runs out of mesh with the shuttle-box-shifting gear by entering the space referred to in the said gear $e$ or $f$, and made by the omission of a tooth therefrom.

The shuttle-box-shifting gear $e$ has a solid hub, which is mounted loosely upon a stud or pin $e^2$, fixed on a bracket or stand at the loom side, the said hub carrying the eccentric $e^{18}$, upon which is mounted the shuttle-box lever $e^4$, the latter having a slot 45, in which is placed a stud 44, entering a link $e^5$, which at its lower end is connected in usual manner with a stud at the lower end of the shuttle-box rod $e^8$, the rear end of the said shuttle-box lever $e^4$ having loosely joined to it a link $e^6$, the opposite end of which fits loosely on a crank-pin $f'$, (see Figs. 1, 13, and 14,) which is adjustably connected by suitable nut with the slotted arm $f^2$, forming part of the hub of the shuttle-box-shifting gear $f$, the gear $f$ having teeth partially and wholly removed at substantially diametrically opposite points, as described in the gear $e$. By or through the pattern chain or surface $b^2$ the indicating-gears may be shifted, as described, longitudinally upon their studs $c'\ d'$ whenever the smooth periphery or surface of the toothed gear $a'$ is in engagement with a depression $a^4$ of the driving-gear $a^2$, and according to the positions of these indicating-gears $c$ and $d$ upon their studs one or the other or both of the said shuttle-box-shifting gears may be rotated or be left at rest, that depending upon whether the shuttle-boxes are to be moved the distance of one or more shuttles or whether a shuttle is to be used for any number of consecutive picks, as is well understood by those conversant with change shuttle-box mechanism. When the gear $e$ is moved for half a rotation in one or the other direction to elevate or depress the lever carried by it, a movement of the shuttle-box will be effected sufficient to make a change from one to the next box, and when the gear $f$ is actuated a half-rotation the lever $e^4$ is moved sufficiently to skip a box, the combination of the movements of the two gears, as is well understood, enabling any one of the four boxes to be reached at will, according to the demands of the pattern-chain.

I have shown in Fig. 1 two like spring-actuated locking devices $g\ g'$, which co-operate with the respective gears $e\ f$, which are suitably notched at their periphery next the loom-frame, as at 28, the said locking devices serving to aid in locking the gears $e\ f$ in the positions in which they may be left by the indicating-gears $c$ or $d$, when the latter run out of mesh with and cease to rotate them. The lay has projecting from it a stand $h$, carrying a pin $h'$, which enters a slot at the lower end of a pawl-carrying lever $h^2$, having its fulcrum at $h^3$ upon a stud on the loom side, the said pawl-carrying lever having a pawl which engages a ratchet which operates the take-up apparatus.

I have shown and described a crank and an eccentric for actuating the shuttle-box lever; but should two cranks or two eccentrics be used for the crank and eccentric it would be a full equivalent and come within the scope of my invention.

I claim—

1. A series of shuttle-boxes, a lever to move the same, a crank and eccentric, shuttle-box-shifting gears having long and short teeth and connected with the crank and eccentric, the intermittingly-moving driving-gear, and indicating-gears located intermediate the said driving-gear and shifting-gears and actuated by the driving-gear to impart to the said shifting-gears a half-rotation and then run out of mesh therewith and leave the said shifting-gears at rest, combined with means to change the relative positions of the said gears longitudinally in the direction of their axes of rotation to again enable the shifting-gears to be started and partially rotated, substantially as described.

2. A series of shuttle-boxes, a lever to move the same, a crank and eccentric, shuttle-box-shifting gears attached thereto and having long and short teeth, the intermittingly-moving driving-gear, and indicating-gears located intermediate the said driving-gear and shifting-gears, and actuated by the driving-gear to impart to the said shifting-gears a half-rotation and then run out of mesh therewith and leave the said shifting-gears at rest, combined with means to change the relative positions of the said gears longitudinally in the direction of their axes of rotation to again enable the shifting-gears to be started and partially rotated, and with stopping devices carried by the said indicating and shifting gears to prevent the latter making more than a half-rotation at one operation, substantially as described.

In testimony whereof I have signed my name to this specification in the presence of two subscribing witnesses.

HORACE WYMAN.

Witnesses:
 JUSTIN A. WARE,
 SAMUEL B. SCHOFIELD.